US006215632B1

(12) United States Patent
Kaluza et al.

(10) Patent No.: US 6,215,632 B1
(45) Date of Patent: Apr. 10, 2001

(54) SWITCHING DEVICE

(75) Inventors: Peter Kaluza, Rieden; Reinhard Maier, Herzogenaurach; Heinz Mitlehner, Uttenreuth; Christian Schreckinger, Kötzting; Gerhard Schröther, Amberg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/142,729

(22) PCT Filed: Mar. 11, 1997

(86) PCT No.: PCT/DE97/00478

§ 371 Date: Sep. 14, 1998

§ 102(e) Date: Sep. 14, 1998

(87) PCT Pub. No.: WO97/34311

PCT Pub. Date: Sep. 18, 1997

(30) Foreign Application Priority Data

Mar. 14, 1996 (DE) ............................................. 196 10 133

(51) Int. Cl.[7] ...................................................... H02H 3/00

(52) U.S. Cl. .................................... 361/2; 361/8; 361/13; 361/115

(58) Field of Search .............................. 361/2, 8, 13, 10, 361/115

(56) References Cited

U.S. PATENT DOCUMENTS 4,685,019 * 8/1987 Needham ................................ 361/2
5,638,038 * 6/1997 Suzuki et al. ............................ 335/6

FOREIGN PATENT DOCUMENTS 25 32 593 1/1971 (DE) ................................ H01H/9/54
1 927 835 11/1972 (DE) ............................ H03K/17/087
43 10 635 9/1993 (DE) .............................. H01H/47/31
94 04 155 6/1994 (DE) ................................ H01H/9/54
92 18 519 8/1994 (DE) ............................ H03K/17/687
0 178 811 4/1986 (EP) ................................ H01H/9/54
0 201 248 11/1986 (EP) ................................ H01H/9/54
0 421 891 4/1991 (EP) ................................ H01H/9/54

* cited by examiner

*Primary Examiner*—Stephen W. Jackson
(74) *Attorney, Agent, or Firm*—Kenyon & Kenyon

(57) ABSTRACT

A switching device including a movable contact member. The movable contact member produces an isolating distance and includes an integral semiconductor switching element.

7 Claims, 1 Drawing Sheet

SWITCHING DEVICE

FIELD OF THE INVENTION

The present invention relates to a switching device having a movable contact member for producing an isolating distance, and having a switching element integrated in the contact member.

BACKGROUND INFORMATION

Switching devices having a movable contact member for producing an isolating distance, and having a switching element integrated in the contact member are known as fuse disconnecting switches. In these devices, the movable contact members contain fuses whose ends are provided with blade contacts, as is described in, for example, German Utility Model G 94 04 155.5.

It is also conventional for a load-current switch or circuit-breaker to be connected toward the input side in series with a switching unit, for example a soft starter for three-phase asynchronous motors.

For electronic branch switches, the use of semiconductor switching elements which, for example, contain silicon or, in a particularly advantageous way, silicon carbide as substrate is recommended. Despite the outstanding insulating properties of silicon carbide given appropriate driving into the locking state, a visible isolating distance is to be ensured for safety reasons in the case of interruption of the current flow.

SUMMARY OF THE INVENTION

It is therefore an object of the present invention to improve a switching device of the above-named type so that the advantageous properties of semiconductor switching elements are associated in a simple way with the requirement for a visible isolating distance.

The object is achieved according to the present invention by virtue of the fact that the switching element is a semiconductor switching element.

DETAILED DESCRIPTION

Figure 2:
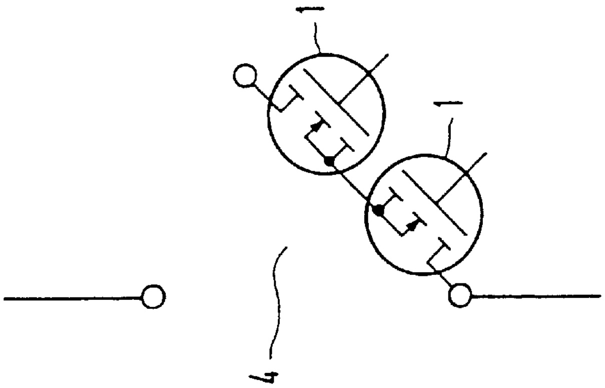
FIG. 2 shows a switching device having semiconductor switching elements integrated in a movable contact member, in the open state.
Figure 1:
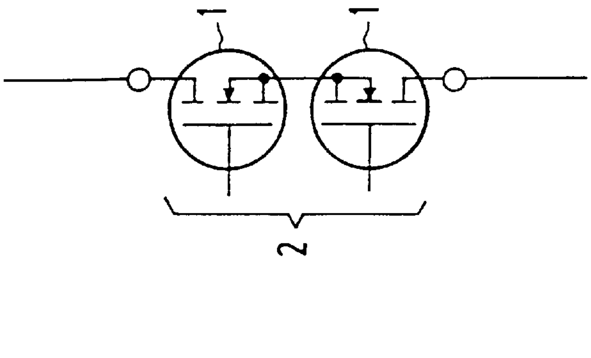
FIG. 1 shows a switching device having semiconductor switching elements integrated in a movable contact member, in the closed state.

In accordance with FIG. 1, the switching device according to the present invention includes at least one semiconductor switching element 1 which is integrated into a movable contact member 2 serving to produce an isolating distance. In the case of the switching device in accordance with FIG. 1, two bidirectionally connected semiconductor switching elements 1, whose substrate consists, for example, of silicon or silicon carbide, are a component of the movable contact member 2. In this arrangement, the connections of the movable contact member 2 are advantageously constructed as blade contacts, as is known from fuse disconnecting switches. In this case, FIG. 1 shows the closed state of the switching device, whereas in FIG. 2 its open state is represented, in which an isolating distance 4 is visible after opening of the movable contact member 2. The switching device can be of single-phase and/or multi-phase design.

Figure 3:
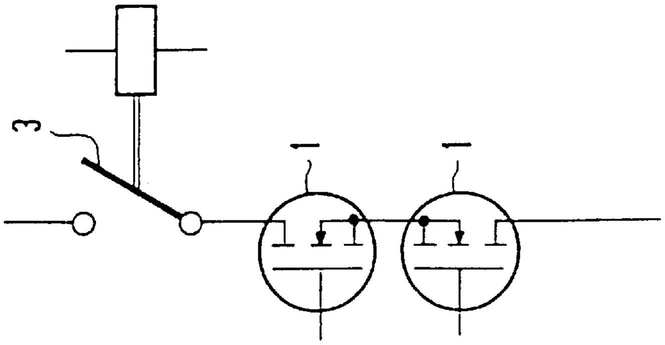
FIG. 3 shows a switching device having semiconductor switching elements and, in series therewith, a switch which can be remotely actuated and has an interrupting element.

A further embodiment of the switching device according to the present invention is represented in FIG. 3, and in this case the semiconductor switching elements 1 are arranged in a fixed fashion, and connected in series therewith is an isolator or switch 3 which can be remotely actuated and by means of which the requirement for a visible isolating distance can be fulfilled.

Remotely actuated switches and semiconductor switches can form a hardware unit in this case. The semiconductor switching elements can also be remotely actuated, for example by a motor.

In the case of the multi-phase design of the switching device having a semiconductor switching element 1 integrated in the contact member 2, it disadvantageous to provide a common drive for the circuit.

What is claimed is:

1. A switching device, comprising:

at least one movable contact member for providing an isolating distance; and a switching element integrated in the at least one movable contact member, the switching element being a semiconductor switching element.

2. The switching device according to claim 1, wherein the semiconductor switching element includes a substrate, the substrate including silicon.

3. The switching device according to claim 1, wherein the semiconductor switching element includes a substrate, the substrate including silicon carbide.

4. The switching device according to claim 1, wherein the switching element is in series with the at least one movable contact when the at least one movable contact is carrying a current.

5. The switching device according to claim 1, wherein the at least one movable contact is actuated from a remote location.

6. The switching device according to claim 1, wherein the switching device has a multi-phase design.

7. The switching device according to claim 6, wherein the at least one movable contact element includes a plurality of movable contact elements, the plurality of contact members being coupled to a common drive.

* * * * *